United States Patent [19]
Iles et al.

[11] Patent Number: 5,813,043
[45] Date of Patent: Sep. 22, 1998

[54] METHOD AND SYSTEM INCLUDING MEMORY PATCHING UTILIZING A TRANSMISSION CONTROL SIGNAL AND CIRCUIT

[75] Inventors: Alexander L. Iles; Rand L. Gray, both of Austin, Tex.; Weilming Sieh, Natick, Mass.; Michael D. Walker, Austin, Tex.

[73] Assignee: Motorola, Inc., Schaumburg, Ill.

[21] Appl. No.: 678,898

[22] Filed: Jul. 12, 1996

[51] Int. Cl.[6] ............. G06F 12/00; G06F 13/00; G06F 11/20

[52] U.S. Cl. .......... 711/163; 711/102; 711/202; 395/182.06; 395/182.05; 371/10.2

[58] Field of Search ................... 711/152, 102, 711/103, 163, 202; 395/182.04, 182.05, 182.06, 183.18; 371/10.2; 365/200

[56] References Cited

U.S. PATENT DOCUMENTS

| | | | |
|---|---|---|---|
| 4,028,683 | 6/1977 | Divine et al. | 711/115 |
| 4,400,798 | 8/1983 | Francis et al. | 365/174 |
| 4,542,453 | 9/1985 | Patrick et al. | 395/182.06 |
| 4,610,000 | 9/1986 | Lee | 365/189.02 |
| 4,769,767 | 9/1988 | Hilbrink | 395/182.06 |
| 4,802,119 | 1/1989 | Heene et al. | 395/182.05 |
| 5,051,897 | 9/1991 | Yamaguchi et al. | 711/103 |
| 5,581,697 | 12/1996 | Gramlich et al. | 395/183.11 |

*Primary Examiner*—Glenn Gossage

[57] ABSTRACT

A data processing system (100, 300) allows an individually mappable word of memory to patch a desired memory location. During operation, a memory system (130) monitors an address/control bus to determine when an access to a specified word in a system memory (120) occurs. When an access to the specified word occurs, address comparators (140) determine if a memory location to be patched is being accessed, and provides an active signal to the access control circuit (150), which prevents data flow with the system memory (120) and enables the data flow with a separate memory (170) by controlling a transmission gate 115. Therefore, the data access occurs from the separate memory and not the system memory.

27 Claims, 4 Drawing Sheets

METHOD AND SYSTEM INCLUDING MEMORY PATCHING UTILIZING A TRANSMISSION CONTROL SIGNAL AND CIRCUIT

FIELD OF THE INVENTION

This invention relates generally to a memory system, and more specifically to a memory system which may be altered in response to an event.

BACKGROUND OF THE INVENTION

In the data processing arts, emulators have been used to provide debug capabilities to a user. Debug capabilities allow a user to monitor what is occurring within a central processing unit (CPU) in a data processing system. General capabilities provided by emulator systems include the ability to provide emulator memory in place of a system memory so that a user is able to download user code to the emulator memory. This is typically accomplished by bypassing the system memory to allow a CPU to execute user code residing in the emulator memory.

Where a target system comprises a CPU and some form of system memory which are to be patched using an emulator, the emulator would traditionally allow a portion of the system memory to be effectively patched by identifying when a certain address is encountered. This address would reside in a program space and, when accessed, would cause a jump to a patched memory location to occur. After the memory patch is completed, it is the responsibility of the patched code to return to the system memory at an appropriate location in the program flow. While real-time flow control in program space has been commonly utilized within emulator parts, the ability to modify and access data on a real-time basis has required that an emulation system maintain a dual ported random access memory (RAM) to allow direct access to the system memory. This is advantageous to the extent that it allows the user to read data from the system memory in a manner that allows for real-time operations and, conversely, to write information to the system memory without affecting real time operations. However, unless dual ported memory is used for the entire memory space, only a portion of the memory space will be available for such operations. Even in situations where the entire system memory space is implemented as a dual port RAM, the system costs associated with such an implementation can be prohibitively expensive. Therefore, it would be desirable to selectively assign dual ported memory words to any word within a system memory to allow any given word within a system of memory to be accessed in a real-time manner as decided by the emulator user.

In addition, it would be desirable from an applications perspective to provide a circuit capable of patching any given word within a MCU memory space with an alternate memory location. This application would allow a program which has detected undesirable data from a sensor, a peripheral, or a bad memory location to replace the data by patching in a substitute memory location which contains the alternate data. Therefore, it would be desirable to provide a system capable of patching a substitute word anywhere into a memory map of a single chip microcontroller.

DETAILED DESCRIPTION OF A PREFERRED EMBODIMENT

Generally, the present invention provides a circuit and method to patch data read from or written to any location in a system memory. Specifically, when the present invention is used to patch read data, the address and control bus for a system memory are monitored to determine when a read access to a specified location in the system occurs. When such a read access occurs, an access control mechanism blocks the data read from the system memory and causes data to be read from a separate memory. Therefore, the data access occurs to the separate memory and not the system memory. When the present invention is used to patch write data, it monitors the system to determine when a particular system event occurs. When such an event occurs, a write patch control mechanism causes a separate memory location to be written from a register. This location is then used as a read patch in subsequent read accesses to that memory location. In the following discussion, the connectivity and operation of several embodiments and applications of a memory which implements the present invention will be provided in greater detail.

Connectivity of the Invention

In the following description of the connectivity of one embodiment of the present invention the term "bus" will be used to refer to a plurality of signals or conductors which may be used to transfer one or more various types of information such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. If the logically true state is a logic level zero, the logically false state will be a logic level one. Furthermore, the symbol "$" preceding a number indicates that the number is represented in its hexadecimal or base 16 form. The symbol "%" preceding a number indicates that the number is represented in its binary or base two form. In the following description of the present invention, it should be noted that the terms "field" and "bit" may be used interchangeably.

Figure 1:
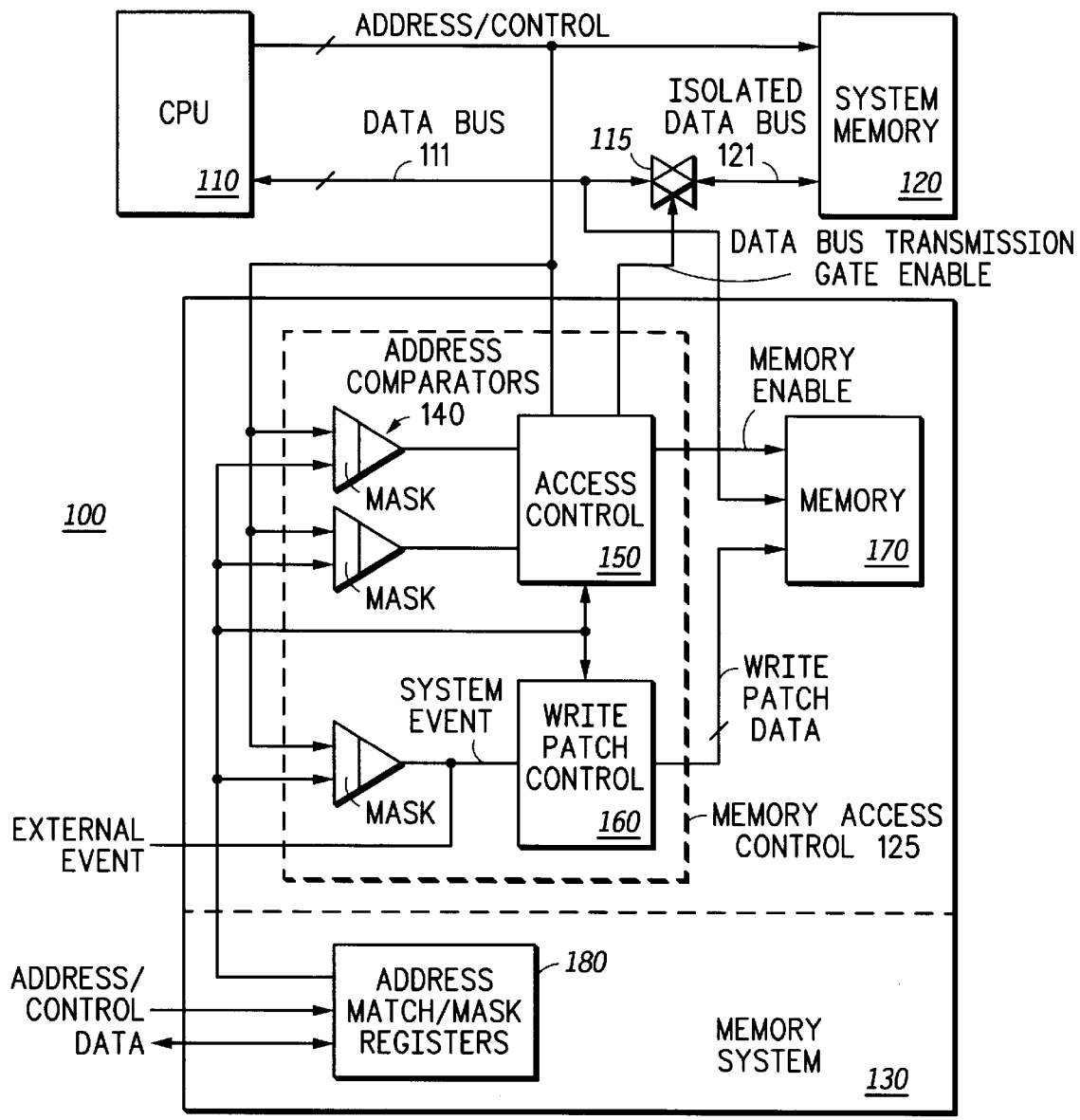
FIG. 1 illustrates, in block diagram form, a data processing system according to a first embodiment of the present invention.

FIG. 1 illustrates a data processing system 100 which comprises a central processing unit (CPU) 110, a system memory 120, and a memory system 130. Memory system 130 comprises a memory access control circuit 125, a memory 170 and address match/mask registers 180. Memory access control circuit 125 includes a plurality of address comparators 140, an access control circuit 150 and a write patch control circuit 160.

CPU 110 is coupled to system memory 120, the plurality of address comparators 140, and access control circuit 150 to provide address/control signals to a bus. CPU 110 is coupled to transmission circuit 115 and memory 170 via a data bus 111. Transmission circuit 115 is coupled to system memory 120 via an isolated data bus 121.

In memory system 130, access control circuit 150 is also coupled to transmission circuit 115 to provide a data bus Transmission Gate Enable signal. Access control circuit 150 is also coupled to memory 170 to provide a Memory Enable signal. The plurality of address match/mask registers 180 is coupled to an external source (not illustrated herein) to receive an address/control signal. Additionally, address match/mask registers 180 are coupled to an external source to communicate information via a Data signal. Address match/mask registers 180 are coupled to the plurality of address comparators 140, access control circuit 150, and write patch control circuit 160 to provide a plurality of match and/or mask values. Additionally, a System Event signal is provided to an input of write patch control circuit 160. Each of the plurality of address comparators 140 provides an output to access control circuit 150. except for one of the plurality of address comparators 140 which provides an output to a System Event input of write patch control circuit 160. Additionally, an External Event signal can drive the System Event signal active, for example, an event control register of register set 180 can drive the External Event signal to override the comparators. Write patch control circuit 160 provides write patch data to memory 170.

Figure 3:
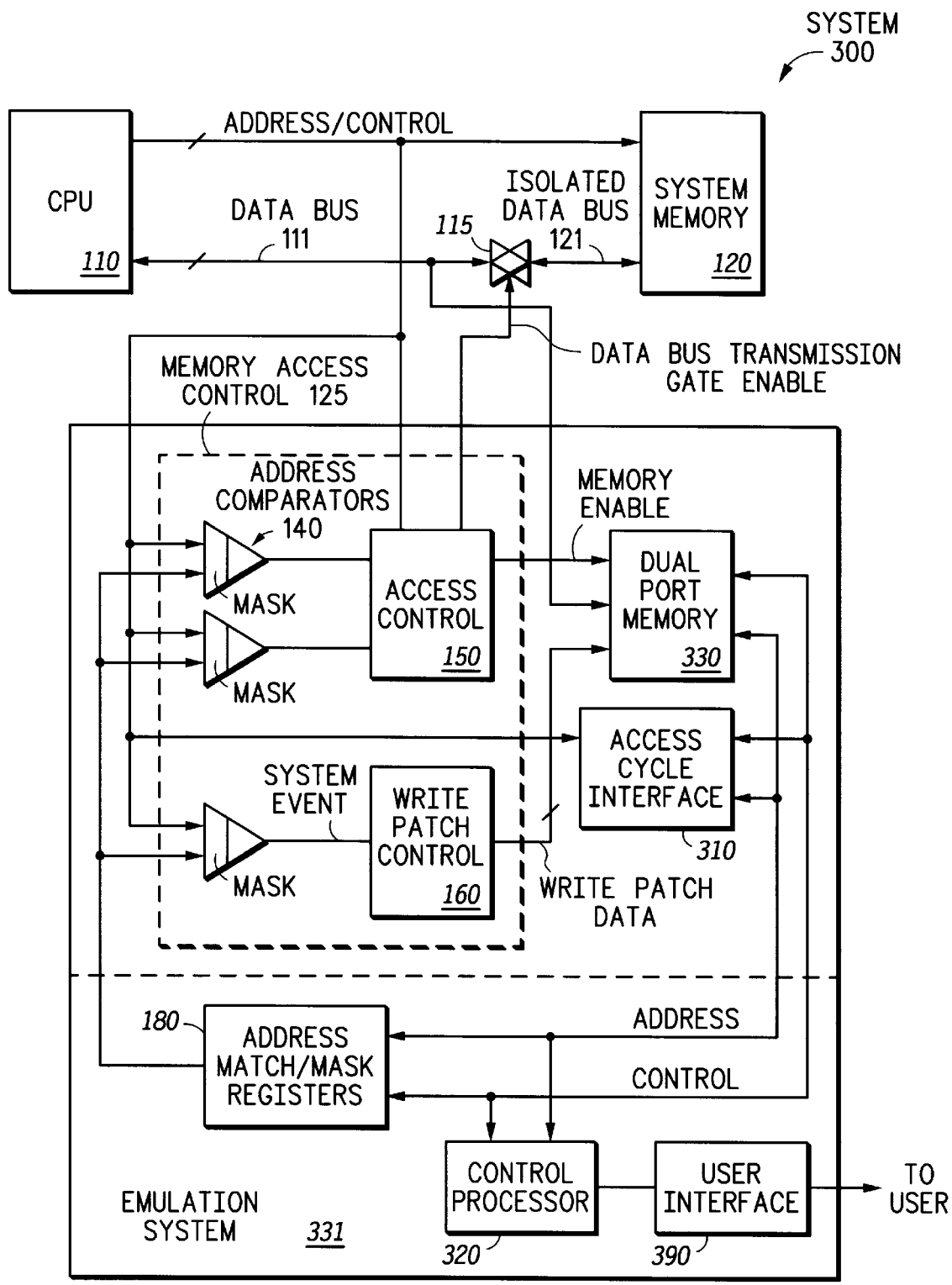
FIG. 3 illustrates, in block diagram form, a data processing system according to a second embodiment of the present invention.

FIG. 3 illustrates a data processing system according to a second embodiment of the present invention. A system 300 comprises a central processing unit (CPU) 110, a transmission circuit 115, a system memory 120, and an emulation system 331. Emulation system 331 comprises a memory access control circuit 325, a dual port memory 330, an access cycle interface 310, a control processor 320, a user interface 390, and a plurality of address match/mask registers 180. Memory access control circuit 325 includes a plurality of address comparators 140, an access control circuit 150, and a write patch control circuit 160.

CPU 110 is coupled to system memory 120, access control circuit 150, and the plurality of address comparators 140. CPU 110 is also coupled to transmission circuit 115 and dual port memory 330 via a Data bus 111. Transmission circuit 115 is coupled to system memory 120 via an Isolated Data bus 121.

Each of the plurality of address comparators 140 provides an output signal to access control circuit 150 (except for one, as noted earlier). Access control circuit 150 is coupled to transmission circuit 115 to provide a data bus Transmission Gate Enable signal. Access control circuit 150 is also coupled to dual port memory 330 to provide a Memory Enable signal. When one of the plurality of address comparators 140 provides an active signal to the write patch control circuit 160, write patch control circuit 160 is actively coupled to dual port memory 330 to provide write patch data. Match/mask address registers 180 are coupled to each of the plurality of address comparators 140 to provide one of a match and/or mask address value thereto.

Address match/mask registers 180 are coupled to each of control processor 320, access cycle interface 310, and dual port memory 330 via a Control bus and an Address bus. An output of control processor 320 is provided to user interface 390.

Figure 4:
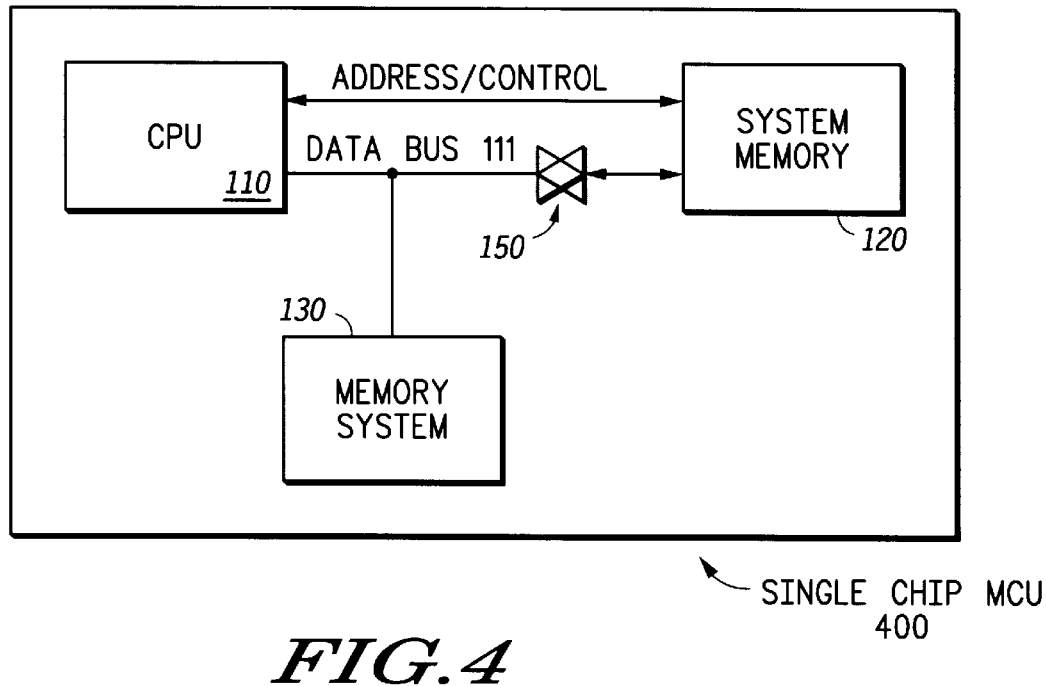
FIG. 4 illustrates, in block diagram form, a single chip MCU according to a first application embodying the present invention.

FIG. 4 illustrates a single chip microcontroller unit (MCU) 400. Single chip MCU 400 includes a CPU 110, a system memory 120, a memory system 130, and a transmission circuit 150. CPU 110 is coupled to both memory system 130 and system memory 120 via an address/control bus. Furthermore, CPU 110 is coupled to memory system 130 via a Data bus. CPU 110 is selectively coupled to system memory 120 through transmission circuit 115 via an Isolated Data bus.

Description of Operation

As discussed earlier, FIG. 1 illustrates, in block diagram form, a data processing system 100. The system 100 has a central processing unit (CPU) 110 which is interfaced to a system memory 120 by an Address/Control bus and a Data bus. In normal operation, CPU 110 provides appropriate address and control signals to system memory 120. In the event of a write operation, data is placed on Data bus 111 by CPU 110. This data is also written onto the isolated data bus 121 when transmission gate 115 is enabled during normal operation. Conversely, in a read mode and upon receiving signals from the Address/Control bus, system memory 120 provides data onto Isolated Data bus 121. This data will also be provided to the data bus 111 through a properly enabled transmission gate 115.

In accordance with the present invention, it may be desirable to effectively replace a given memory location within system memory 120. Through the use of memory system 130, the present invention can be used to "patch out" a single word of information without affecting the subsequent program flow, or adjacent data acquisition. In contrast to the present invention, the prior art teaches the steps of replacing circuits of program data with patched program data and requires the patched program to be responsible for returning program flow to a normal flow within the system memory. Prior art implementations do not address the ability to selectively patch a single data location in a memory map.

Memory control system 130 is connected to the CPU 110 via the Address/Control bus and Data bus 111. Memory system 130 provides a Transmission Gate Enable signal to the transmission gate 115. Memory system 130 monitors address information communicated by the Address/Control bus and determines when an address location to be replaced is encountered. Upon encountering an address location to be replaced, the Transmission Gate Enable signal is negated to disable transmission gate 115 and effectively isolate system memory 120 from Data bus 111. In addition, memory system 130 also responds to the address location to be replaced on the Address/Control bus by providing necessary data to Data bus 111 in the event of a read operation, or reading information from Data bus 111 in the event of a write operation.

Memory system 130 comprises a memory access control circuit 125, a memory 170, and match/mask address registers 180. Address match/mask registers 180 are coupled to an externally provided plurality of Address/Control signals and an external Data bus. This plurality of Address/Control signals and the external Data bus may be the same Address/Control bus as accessed by the CPU 110 and Data bus 111 or it may be address, control, and data information from a different controlling device (not illustrated herein). The address, control and data information received by address match/mask registers 180 specify an address location to be patched, as well as any mask information which may be associated with one of the registers.

For example, in one embodiment, it may be desirable for a word of data at memory location $100 in system memory 120 to be swapped out, or "patched," with a word of data from memory 170. In accordance with one embodiment of the present invention, a register in the address match/mask registers 180 is pre-written to contain a value $100 representing an address location in system memory 120. If mask registers are implemented in address match/mask registers 180, the mask register would be set such that no bits of the address were masked. This address and mask information is received by the memory access control circuit 125 which applies the mask a portion to the address register data and the address/control values, performs a compare operation, and provides the Transmission Gate Enable signal in response to the compare results. For further illustration, if a match is determined to occur, the Transmission Gate Enable signal provided to transmission gate 115 is negated. When the Transmission Gate Enable signal is negated, system memory 120 is isolated from Data bus 111. In addition, when a match occurs, memory access control circuit 125 provides appropriate memory control signals via the Memory Enable bus to the memory 170. The memory control signals provided via the Memory Enable bus include enabling information which indicates whether a write or a read operation is occurring. Upon receiving the appropriate memory control signals after a comparison operation, memory 170 will either store data provided by Data bus 111 or provide data to Data bus 111 in response to the aforementioned enabling information.

Memory access control circuit 125 has one or more address comparators 140. In one implementation, address comparators 140 would be configured to mask specified bits of compare data values and address/control values. For example, if it were desirable to detect a four word contiguous block of data in memory system 120, the lower two bits of the data to be compared could be masked using a mask information value at the address comparators 140. The address comparators 140 receive the mask information from the address match/mask registers 180. Additionally, a match address value is received from the address match/mask registers 180. Furthermore, an address value is received from the Address/Control bus. This address valve from the Address/Control bus is compared to the match address value provided from address match/mask registers 180. In an embodiment where a plurality of address comparators 140 are used, each of address/mask registers 180 would be associated with one of the individual address comparators 140.

Figure 2:
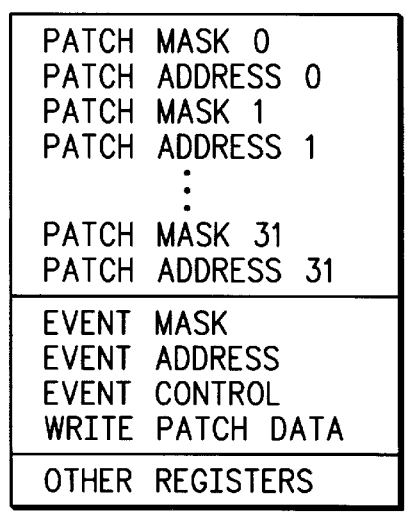
FIG. 2 illustrates, in block diagram form, a plurality of address match/mask registers of FIG. 1.

FIG. 2 illustrates, in tabular form, a possible register set 180 which contains mask and address information for thirty-two comparators. The mask information is labeled as Patch MaskO through Patch Mask31, while the match address label information is labeled as Patch Address0 through Patch Address31. Again, it is understood that address match/mask registers 180 could be stored at any one of a number of locations including CPU 110, or in an external control device which is integrated with memory system 130.

Once a successful address compare has occurred at one comparator of the address comparators 140, the access control circuit 150 receives an asserted match signal. Based on this asserted match signal, the Transmission Gate Enable signal is negated. When the Transmission Gate Enable signal is negated, Isolated Data bus 121 is isolated from Data bus 111 by transmission gate 115. Subsequently, memory 170 is provided with appropriate memory control signals via the Memory Enable bus to patch in a memory word from memory 170.

In accordance with the present invention, FIG. 1 also illustrates a write patch control circuit 160. The write patch control circuit 160 is used to modify the contents of memory 170 based on an event. The event could be generated by one of the comparators of address comparators 140, or it could be an event completely external to memory system 130. In either case, upon receipt of an asserted Event signal, write patch control circuit 160 will respond in a predefined manner.

In one implementation of the write patch control circuit 160, an address comparator would receive an event mask and an address mask from address match/mask registers 180, as illustrated in FIG. 2, to determine when a system event occurs. In addition, as illustrated in FIG. 2, an event control register may be used to enable write patch control circuit 160. A fourth register, Write Patch Data, is also illustrated in FIG. 2. The Write Patch Data register is used in one embodiment to hold a value which is to be stored at the patched memory location in memory 170 to replace the data which had previously been transferred via Data bus 111. Such an implementation would be useful when a data value is written to a particular memory location which causes undesirable system operation. In this situation, it is desirable to patch the data written with an alternate data value. Furthermore, the presence of the undesirable data value can be recognized by a particular system event. The system event is recognized by using the write patch mechanism's address comparator. When a match of this comparator occurs, the Write Patch Data register value is transferred to memory 170. Thus, the undesired data value is patched.

In the implementation illustrated in FIG. 1, write patch control circuit 160 is illustrated providing Write Patch Data to memory circuit 170. It should be understood that the Write Patch Data bus should be multiplexed with Data bus 111 when a single ported RAM is used. Additionally, the Write Patch Data bus could access memory 170 directly when a dual ported RAM is used.

As discussed earlier, FIG. 3 illustrates a system 300 in accordance with the present invention. Circuits having similar functions with circuits in system 100 will have the same numbering as their counterparts of FIG. 1. System 300 comprises an emulation system 331 which is closely analogous to the memory system 130 of FIG. 1. The emulation system 331 is generally used as a development tool for a CPU 110 and allows a user to monitor various states and operations of the CPU 110. Emulation system 331 has a control processor 320 which interfaces to an external user (not shown) through user interface 390. Using user interface 390, the external user manipulates control processor 320 and provides address match and mask information to be stored at address match/mask registers 180. In a manner previously described, registers 180 are used to control memory access control circuit 125.

In the embodiment of the system 300 described herein, memory access control circuit 125 accesses a primary side of a dual port memory 330. The secondary side of the dual port memory 300 is directly accessible from control processor 320. An access cycle interface unit 310 is implemented in order to avoid conflicts between CPU 110 and control processor 320 when both are accessing dual port memory 320. Access cycle interface unit 310 monitors the Address/Control bus coupled to CPU 110 and the address in control processor 320. Access cycle interface unit 310 then arbitrates between CPU 110 and control processor 320 by giving priority to accesses by CPU 110.

Referring to address match/mask registers 180, as illustrated in FIG. 2, other optional registers are indicated. System 300 allows for registers 180 to indicate such features as a shadow mode, a Read Only Memory (ROM) mode, or a size mode. In a shadow mode, memory 330 As configured to shadow system memory 120. This would effectively disable any reads from memory 330 for a given memory location. In a ROM mode, only reads to a desired address would occur from dual port memory 330. This would prevent the data from being modified by disabling writes for a given location to memory 330. If a size mode register bit were implemented, the size mode register bit could be used to implement an interface for systems having a different bus size than memory 330. For example, if memory 330 has an eight bit memory interface, it may be desirable to interface memory 330 to a bus having sixteen bits. Based on the size mode register bit, data from an upper or lower eight bits of the sixteen bit bus could be provided to memory 330.

FIG. 4 illustrates a single chip MCU 400. For a single chip MCU 400, the present invention would be implemented on a single die of semiconductor silicon. This has the effect of incorporating the CPU 110, system memory 120, transmission gate 115, access control circuit 150, and system memory 130 on a single integrated circuit.

Figure 5:
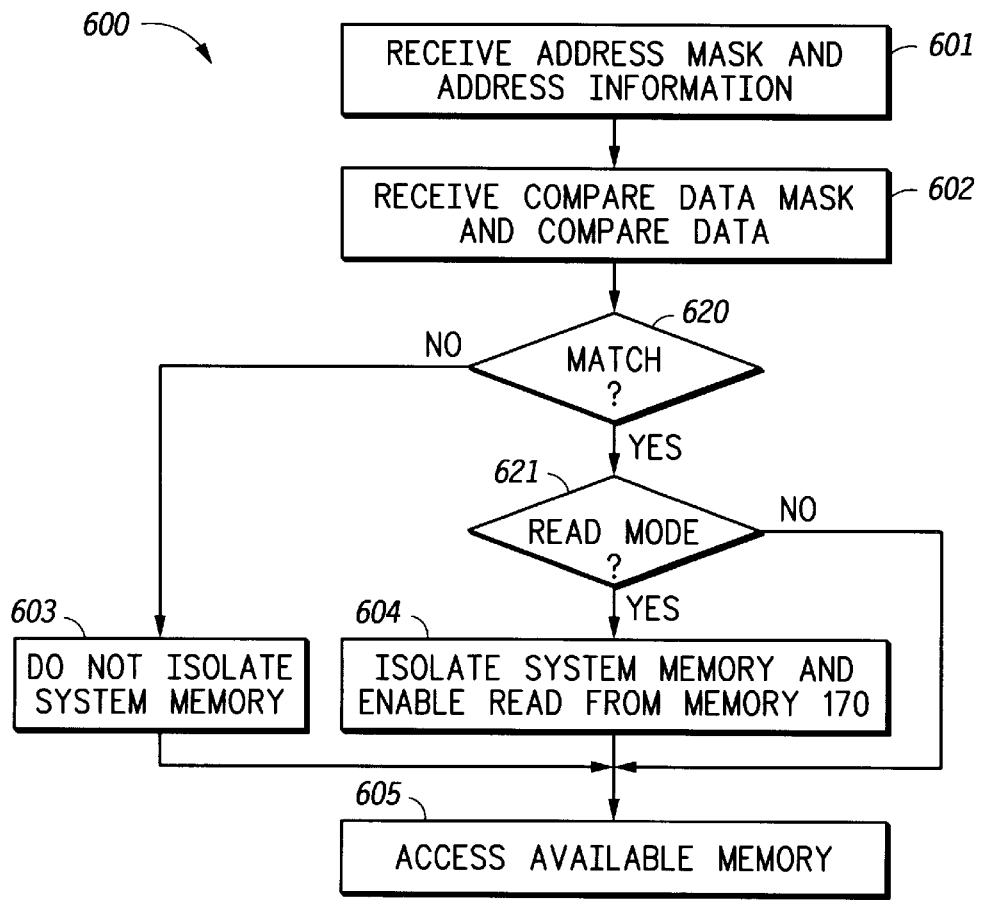
FIG. 5 illustrates, in flow diagram form, a method in accordance with a first operation executed in accordance with the present invention.

FIG. 5, illustrates in flow diagram form, a method 600 in accordance with the present invention for patching a memory location at an MCU. At step 601 address information and address mask information is received. At step 602, compare data and compare data mask information is received. At a step 620, a compare operation of the masked address information (from step 601) and the masked compare data information (from step 602) is performed. In the event the masked address and compare do not match, an execution flow continues at step 603. At 603, no system memory isolation occurs. In other words, no patch occurs. Subsequently, the flow proceeds to step 605. However, if the masked address and masked compare data information do match, the execution flow continues at step 621. At step 621, a determination is made as to whether or not the masked address and control information indicates a read mode. A read mode would indicate that CPU 110 is attempting to read information from the system memory. In the event a read mode is not occurring, flow proceeds to step 605, and if a read mode is occurring, the execution flow proceeds to step 604. At step 604, a system memory is isolated and memory 170 is enabled. By isolating the system memory, the system memory will not be accessed by CPU 110. In the event the information between the masked address and the masked compare data did not match at step 620, the system memory is not isolated (step 603). This allows CPU 110 to access the system memory 120. Next, at step 605, the execution flow proceeds from step 603 or step 604 and the available memory is accessed. The available memory includes those memory subsystems which are not isolated by step 604.

Figure 6:
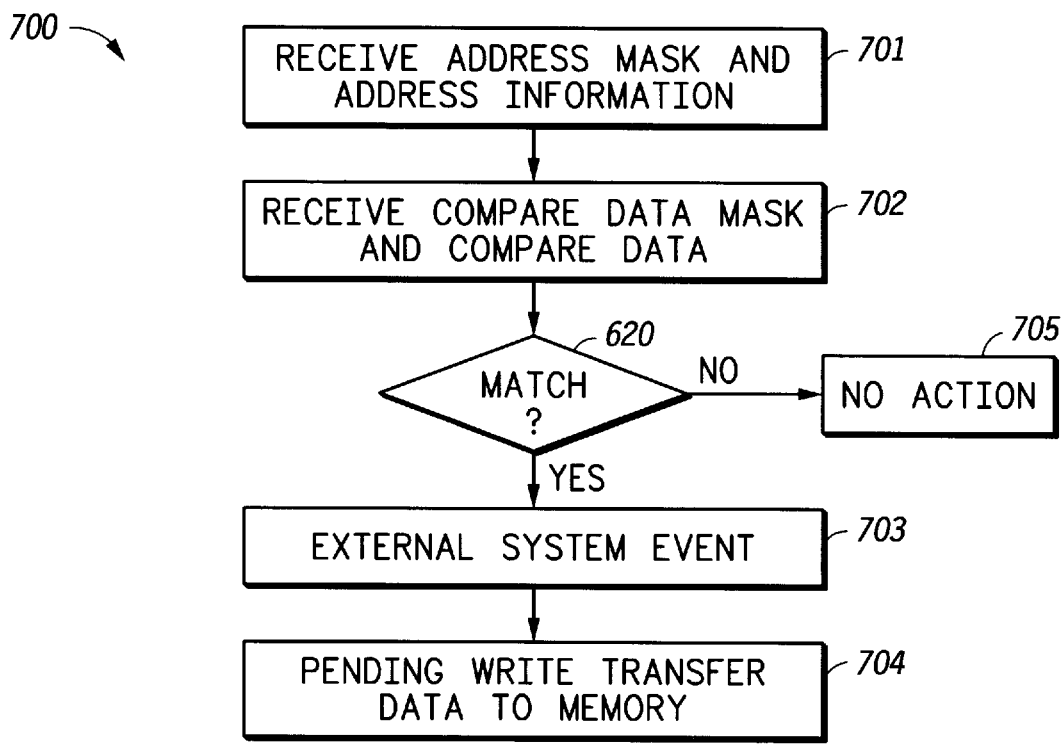
FIG. 6 illustrates, in flow diagram form, a method in accordance with a second operation executed in accordance with the present invention.

FIG. 6 illustrates, in flow diagram form, a method 700 in accordance with the present invention. Step 701 corresponds to step 601 of FIG. 6. Step 702 corresponds to step 602 of FIG. 6. Step 720 corresponds to step 620 of FIG. 6 in that a determination is made whether the masked address of step 601 and the masked compare data of step 602 match one another. In the event a match occurs, the execution flow proceeds to step 703 which triggers execution of an event. Note, at step 703 an external event can also trigger the execution of this step. An external event indicates an event occurred and a match is not determined by the address compare function of step 620. Next, at step 704, the event is completed. In accordance with one embodiment of the invention the write patch data is then transferred to memory. If no compare match occurs at step 620, the execution flow proceeds to step 705 where no action is taken. The method 700 of FIG. 7 allows for an alternative event to occur when a given memory location is being accessed or at any other time as determined by an external event generating system.

Thus, the present invention may be used to substitute alternative data values in place of missing or faulty sensor readings in a real time control system. Furthermore, it provides independent control of subsystem behavior by permitting data value overrides within the system. It also provides a method for "repairing" bad or misleading data from system memory, peripherals, or sensors, thus providing a convenient and safe method for stabilizing erratic real time system behavior. This method minimizes the software complexity of the real time system by eliminating special case paths in the program, which can be difficult to test and may also make the system prone to error.

The implementation of the invention described herein is provided by way of example only, and many other implementations may exist for executing the function described herein. For example, the memory system illustrated in the present invention may be implemented as a single integrated circuit, as a subsystem within a single integrated circuit, or as part of a multi-integrated circuit development system.

The applications described in the present patent application should not be construed as limiting the application of the present invention. For example, the present invention may also be used in applications involving direct memory access controllers and multi-processor systems. Furthermore, the logic used to implement the present embodiment of the invention may be modified in any manner which does not render the invention unworkable for its present purposes.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the spirit and scope of this invention.

We claim:

1. A data processing system, comprising:
   a central processing unit for providing a first address value and communicating a plurality of control values;
   a system memory coupled to the central processing unit for selectively receiving the first address value and the plurality of control values, the system memory providing a first data value in response to the first address value and a portion of the plurality of control values;
   memory access control means for providing a transmission control signal and a second memory enable signal, the memory access control means being coupled to the central processing unit for receiving the first address value and the plurality of control values, the memory access control means generating the transmission control signal in response to one of the first address value and a first one of the plurality of control values, the memory access control means generating the second memory enable signal in response to the first address value;
   a second memory for storing a second data value and selectively providing the second data value in response to the second memory enable signal, the second memory being coupled to the memory access control means for receiving the second memory enable signal; and
   a transmission circuit coupled between the system memory and the central processing unit for selectively providing the first data value to the central processing unit when the transmission control signal is in a first logic state.

2. The data processing system of claim 1 wherein the second memory enable signal is asserted to prevent conflicts between said central processing unit and said memory access control means.

3. The data processing system of claim 1 wherein the second memory is a dual port memory.

4. The data processing system of claim 1 wherein the second memory is an electrically erasable memory.

5. The data processing system of claim 1, further comprising:
a register for storing a bit which enables the second memory to be written with a plurality of data values provided by the central processing unit.

6. The data processing system of claim 1, further comprising:
a register for storing a bit which enables the second memory to be read and disables the second memory from being written.

7. The data processing system of claim 1 wherein the data processing system is implemented on a single integrated circuit.

8. The data processing system of claim 1 wherein the second memory is a register.

9. The data processing system of claim 1, further comprising:
a first register for communicating at least one of a mask value and a match value to said memory access control means.

10. The data processing system of claim 9, wherein the memory access control means comprises:
a comparator coupled to the central processing unit for receiving the first address value and coupled to the first register for receiving at least one of the mask value and the match value, the comparator comparing the first address value and at least one of the mask value and the match value to provide a compare output value;
and a memory encode and control circuit coupled to the comparator for receiving the compare output value and coupled to the central processing unit for receiving the first one of the plurality of control signals, the memory encode and control circuit providing the transmission control signal and the second memory enable signal in response thereto.

11. The data processing system of claim 10 wherein the comparator uses the mask value to mask a first portion of the first address value.

12. The data processing system of claim 11 wherein the first portion is a set of upper bits of the first address value.

13. The data processing system of claim 10, further comprising:
a write patch control circuit for selectively providing a pending data value to the second memory in response to a system event signal in a first logic state.

14. The data processing system of claim 13 wherein an integrated circuit pin provides the system event signal.

15. The data processing system of 13 further comprising:
an event comparator coupled to the central processing unit for receiving the first address value and a second one of the plurality of control values, the event comparator providing the system event signal in the first logic state in response to a preselected system event when the first address value corresponds to a pending address value.

16. The data processing system of 15 further comprising:
a second register for communicating at least one of a pending mask value and the pending address value to the event comparator.

17. The data processing system of 16 wherein the pending mask value masks a portion of the pending address value compared with the first address value by the event comparator.

18. A method, comprising the steps of:
receiving one of a first address value and a first control value provided by a central processing unit;
retrieving a first match value from a first match register;
comparing the one of the first address value and the first control value with the first match value;
retrieving a first data value from a system memory;
enabling a transmission circuit to provide the first data value to the central processing unit when the one of the first address value and the first control value does not correspond to the first match value;
determining whether one of a read and a write operation is being executed by the central processing unit when the one of the first address value and the first control value corresponds to the first match value;
retrieving a second data value from a second memory when the read operation is being executed by the central processing unit;
enabling the transmission circuit to provide the second data value to the central processing unit when the one of the first address value and the first control value corresponds to the first match value;
retrieving a third data value from the central processing unit when the write operation is being executed by the central processing unit and when the one of the first address value and the first control value corresponds to the first match value; and
storing the third data value in the second memory when the write operation is being executed by the central processing unit and when the one of the first address value and the first control value corresponds to the first match value.

19. The method of claim 18, further comprising the steps of:
retrieving a first mask value from a mask register;
and masking a first portion of the first address value before executing the step of comparing.

20. The method of claim 18, further comprising the steps of:
detecting an occurrence of a system event;
determining whether the system event is one of an external event and a processing event; and
enabling a write patch control circuit to provide a pending data value to the second memory when the system event is the external event.

21. The method of claim 20, further comprising the steps of:
comparing the one of the first address value and the first control value with the first match value when the system event is the processing event;
executing no operation when the one of the first address value and the first control value does not correspond with the first match value; and
enabling the write patch control circuit to provide the pending data value to the second memory when the system event is the processing event.

22. An emulation system, comprising:
bus means for communicating a plurality of data values;
a central processing unit for communicating a plurality of address values and a plurality of control values, the central processing unit coupled to the bus means for communicating the plurality of data values;
a target memory coupled to the central processing unit for selectively receiving a first address value of the plurality of address values and the plurality of control values and coupled to the bus means for communicating the plurality of data values, the target memory providing a first data value to the bus means in response to the first address value and a portion of the plurality of control values;

a memory access control circuit for providing a transmission control signal and a second memory enable signal, the memory access control circuit being coupled to the central processing unit for receiving the first address value and the plurality of control values, the memory access control circuit generating the transmission control signal in response to one of the first address value and a first one of the plurality of control values, the memory access control circuit generating the second memory enable signal in response to the first address value;

a second memory for storing a second data value and selectively providing the second data value in response to the second memory enable signal, the second memory being coupled to the memory access control circuit for receiving the second memory enable signal;

and a transmission circuit coupled to the bus means to selectively allow the bus means to provide the first data value to the central processing unit when the transmission control signal is in a first logic state.

23. The emulation system of claim 22 wherein the memory access control circuit and the second memory are implemented on a single integrated circuit.

24. The emulation system of claim 22, further comprising:

a first register for communicating at least one of a mask value and a match value to said memory access control circuit.

25. The emulation system of claim 24, wherein the memory access circuit comprises:

a comparator coupled to the central processing unit for receiving the first address value and coupled to the first register for receiving at least one of the mask value and the match value, the comparator comparing the first address value and at least one of the mask value and the match value to provide a compare output value;

and a memory encode and control circuit coupled to the comparator for receiving the compare output value and coupled to the central processing unit for receiving the first one of the plurality of control signals, the memory encode and control circuit providing the transmission control signal and the second memory enable signal in response thereto.

26. The emulation system of claim 25, wherein the memory access control circuit further comprises a write patch control circuit for selectively providing a pending data value to the second memory in response to a system event signal in a first logic state.

27. The data processing system of 26 further comprising:

an event comparator coupled to the central processing unit for receiving the first address value and a second one of the plurality of control values, the event comparator providing the system event signal in the first logic state in response to a preselected system event when the first address value corresponds to a pending address value.

* * * * *